(12) United States Patent
Sundaram et al.

(10) Patent No.: US 6,928,473 B1
(45) Date of Patent: Aug. 9, 2005

(54) MEASURING NETWORK JITTER ON APPLICATION PACKET FLOWS

(75) Inventors: Rajesh Sundaram, Redmond, WA (US); Sanjay N. Kaniyar, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 804 days.

(21) Appl. No.: 09/670,157

(22) Filed: Sep. 26, 2000

(51) Int. Cl.$^7$ ............................................. G06F 15/173
(52) U.S. Cl. ..................................... 709/224; 709/223
(58) Field of Search .............................. 709/224, 203, 709/223, 228; 370/252, 516, 519, 241

(56) References Cited

U.S. PATENT DOCUMENTS

| | | | | |
|---|---|---|---|---|
| 5,806,063 | A | * | 9/1998 | Dickens .......................... 707/6 |
| 5,883,924 | A | * | 3/1999 | Siu et al. ..................... 375/226 |
| 6,512,746 | B1 | * | 1/2003 | Sand ........................... 370/252 |
| 2002/0024973 | A1 | * | 2/2002 | Tavana et al. ............... 370/508 |
| 2002/0039371 | A1 | * | 4/2002 | Hedayat et al. ............. 370/516 |

OTHER PUBLICATIONS

Ian D. Graham, Stephen F. Donnelly, Stele Martin, Jed Martens, John G. Cleary, "Nonintrusive and Accurate Measurement of Unidirectional Delay and Delay Variation on the Internet", Proceedings of INET'98 Conference, Jul. 1998.*

Ian Graham, Murray Pearson, Jed Martens, Stephen Donnelly, John G. Cleary, "A remote ATM network monitoring system", Proceedings of 3rd New Zealand ATM and Broadband Workshop, 1999.*

P. Srisuresh, D. Gan, RFC 2391, "Load Sharing using IP Network Address Translation (LSNAT)", Aug. 1998, pp. 3–4.*

Andrew S. Tanenbaum, "Computer Networks", 1996, Prentice Hall, Third Edition, pp. 202–219.*

Sunil Kalidindi and Matthew J. Zekauskas, "Surveyor: An Infrastructure for Internet Performance Measurements", Proceedings of INET'99, San Jose, CA, USA, Jun. 22–25, 1999.*

N.G. Duffield and M. Grossglauser, "Trajectory Sampling for Direct Traffic Observation", Proceedings of SIG-COMM'00, pp. 271–282, Aug. 2000.*

Vern Paxson, "On Calibrating Measurements of Packet Transit Times", Proceedings of SIGMETRICS '98, pp. 11–21.*

(Continued)

*Primary Examiner*—Frantz B. Jean
*Assistant Examiner*—Aaron Strange
(74) *Attorney, Agent, or Firm*—Microsoft Corp.

(57) ABSTRACT

A method is described for measuring the jitter experienced by an application's network traffic. The measurement is based solely on packets sent or received by the application itself. The method does not alter the application's packets, in particular, it does not add a timestamp to the packets before they are sent. Instead, it creates a table that stores unique identifiers of the application's packets along with the time the packets are sent. On the receiving computer, a similar table is created that stores the unique packet identifiers along with the time the packets are received. Records of sent packets are associated with records of received packets so that the time a packet was sent can be compared to the time the same packet was received. The resulting data are processed to calculate network jitter and packet loss ratios.

4 Claims, 19 Drawing Sheets

OTHER PUBLICATIONS

Sue B. Moon, Paul Skelly, and Don Towsley, "Estimation and Removal of Clock Skew from Network Delay Measurements", Proceedings of the Conference on Computer Communications (IEEE Infocom), (New York), Mar. 1999.*

Barbara Liskov, Liuba Shirira, and John Wroclawski, "Efficient At-Most-Once Messages Based on Synchronized Clocks", ACM Transactions on Computer Systems, vol. 9, No. 2, May 1991, pp. 125-142.*

U.S. Appl. No. 09/157,645, filed Sep. 21, 1998, Eilebrecht et al.

U.S. Appl. No. 09/537,995, filed Mar. 29, 2000, Holmes et al.

Sayeed, Azhur, "Communications Focus: The LAN Meets The Web," *Electronic Engineering Times*, 2000, n 1097, p. 110.

"TransMedia Unveils Industry's First Intelligent 'Media Aware' Carrier-Grade Switch, Speeds Evolution to Converged Network and High-Revenue Multimedia Sevices," Business Wire, p0066, San Jose, CA, Jan. 6, 1999.

"IP Telephony: OPS Handicap Its Chances,," Multichannel News, v 19, n23, p. 3A1, Jun. 9, 1998.

Kempainen, Stephen, "Gigabit Ethernet and ATM go neck and neck in the communications race," EDN, v42, n1, p.32(12), Jan. 2, 1997.

* cited by examiner

| TimeSent | TimeReceived | Latency |
|----------|--------------|---------|
| 10 | 13 | 3 |
| 11 | 19 | 8 |
| 12 | 18 | 6 |

*FIG. 6*

| TimeSent | TimeReceived | Latency |
|----------|--------------|---------|
| 0 | 13 | 3 |
| 1 | 19 | 8 |
| 2 | 18 | 6 |

*FIG. 7*

| TimeSent | TimeReceived | Latency |
|----------|--------------|---------|
| 0 | 3 | 3 |
| 1 | 9 | 8 |
| 2 | 8 | 6 |

*FIG. 8*

| TimeSent | TimeReceived | Latency |
|----------|--------------|---------|
| 0 | 0 | 0 |
| 1 | 6 | 5 |
| 2 | 5 | 3 |

Timestamp Buffer (1801 if on sender, 1802 if on receiver)

| Sender IP Address 1901 | Sender IP Port 1902 | Receiver IP Address 1903 | Receiver IP Port 1904 | Network Protocol 1905 | IP ID 1906 | Timestamp 1907 |
|---|---|---|---|---|---|---|
| | | | | | | |

FIG. 20A

Sender Timestamp Buffer — 1801

| IP ID 1906 | Timestamp 1907 |
|---|---|
| 0xFFFC | 23 |
| 0xFFFD | 24 |
| 0xFFFE | 29 |
| 0xFFFF | 32 |
| 0x0000 | 48 |
| 0x0001 | 51 |
| 0x0002 | 52 |
| 0x0003 | 79 |

FIG. 20B

Receiver Timestamp Buffer — 1802

| IP ID 1906 | Timestamp 1907 |
|---|---|
| 0x0000 | 3 |
| 0x0003 | 8 |
| 0x0001 | 9 |
| 0xFFFE | 12 |
| 0xFFFF | 28 |
| 0xFFFC | 31 |

FIG. 20C

Receiver Timestamp Buffer — 1802

| IP ID 1906 | Timestamp 1907 |
|---|---|
| 0x0000 | 3 |
| 0x0001 | 9 |
| 0x0003 | 8 |
| 0xFFFE | 12 |
| 0xFFFF | 28 |
| 0xFFFC | 31 |

FIG. 20D

Receiver Timestamp Buffer — 1802

| IP ID 1906 | Timestamp 1907 |
|---|---|
| 0x0000 | 3 |
| 0x0001 | 9 |
| 0x0003 | 8 |
| 0xFFFC | 31 |
| 0xFFFE | 12 |
| 0xFFFF | 28 |

FIG. 20E

Receiver Timestamp Buffer — 1802

| IP ID 1906 | Timestamp 1907 |
|---|---|
| 0xFFFC | 31 |
| 0xFFFE | 12 |
| 0xFFFF | 28 |
| 0x0000 | 3 |
| 0x0001 | 9 |
| 0x0003 | 8 |

FIG. 22

Associated Timestamp Records

| Packet Flow Identifier 1901-1905 | IP ID 1906 | Sender Timestamp | Receiver Timestamp |
|---|---|---|---|
| | 0xFFFC | 23 | 31 |
| | 0xFFFD | 24 | Lost |
| | 0xFFFE | 29 | 12 |
| | 0xFFFF | 32 | 28 |
| | 0x0000 | 48 | 3 |
| | 0x0001 | 51 | 9 |
| | 0x0002 | 52 | Lost |
| | 0x0003 | 79 | 8 |

MEASURING NETWORK JITTER ON APPLICATION PACKET FLOWS

TECHNICAL FIELD

The present invention relates generally to computer networks, and, more particularly, to measuring variations in the latency of transmissions over computer networks.

BACKGROUND OF THE INVENTION

Traffic flowing from an application running on one computer to an application running on another computer might pass through several network elements such as operating system queues, network adapter cards, LANs, routers, and the like. Each element transmits data at a finite rate so each element has the potential to slow the passage of the traffic. Congestion occurs whenever the rate at which data are sent to a network element exceeds the rate at which the network element transmits the data. Network elements may cope with congestion by queuing data until the congestion subsides or by discarding data to alleviate the congestion.

As a result of the methods of handling congestion, applications face variations in the time needed to transport data (network latency) and in the amount of data lost in transmission. Applications differ from one another in how tolerant they are of these variations. Real-time video and audio applications, for example, cannot tolerate large variations in either latency or in data loss.

Some networks issue Quality of Service (QoS) guarantees concerning their ability to support the specific traffic requirements of applications. QoS guarantees are implemented in a network by allocating scarce resources to application traffic flows in a manner that meets the applications' traffic requirements. For example, a congested network element might queue the traffic of applications that are tolerant of latency while transmitting latency-sensitive traffic without delay. When the congestion clears, the queued traffic may be sent.

While the benefits of QoS guarantees are generally acknowledged, those benefits are difficult to measure accurately. For example, some existing tools attempt to measure latency by transmitting a large amount of data and then determining how much time passes until the data are received. This technique gives, at best, a very coarse measurement of latency, averaged over the entire period of transmission. Measurement techniques such as "pinging" the receiver are more accurate, but merely provide average, round-trip latency information. In reality, the latency may be substantially different in the two directions, and that difference may be significant to an application that streams video or audio.

Another problem with measuring latency stems from differences in the clocks on the sending and receiving computers. Measurements based on the difference between the time of transmission as measured on the sending computer and the time of reception as measured on the receiving computer depend upon a careful synchronization of the two clocks. Complex latency measurement tools exist, often relying on radios, satellite receivers, or modems to synchronize the clocks of the sender and receiver, but these tools are often expensive and serve only to bound the problem, not to eliminate it.

The invention described in U.S. patent application Ser. No. 09/537,995, "Method and System for Accurately Calculating Latency Variation on an End-to-End Path in a Network," filed on Mar. 29, 2000, advances the art of QoS measurement by focusing on variations in latency (jitter) rather than on latency itself. The invention generates a predetermined number of packets on a sending computer. The packets are timestamped with the sender's local time and then sent over the network to a receiver. When a packet arrives at the receiver, it is similarly timestamped with the receiver's local time. The difference in the timestamps for each packet is recorded. These records provide only a rough measurement of latency because the clocks are not synchronized, but the variation among the records is an accurate measurement of network jitter. Measurements can be run with and without QoS mechanisms in place to see how well those mechanisms even out transport variations.

For some applications, however, the invention described in Ser. No. 09/537,995 is not adequate because it relies on a traffic flow generated by the measurement tool itself. Introducing that traffic flow into the network may distort the characteristics of network traffic so much that the resulting jitter measurements do not accurately indicate the conditions faced by an application. Also, the patterns of traffic generated by certain applications may be very complex and may not be well modeled by a tool that sends fixed-size packets at a fixed rate. What is desired is a tool that measures network jitter using packets generated by an application rather than packets generated by the tool itself.

SUMMARY OF THE INVENTION

The above problems and shortcomings, and others, are addressed by the present invention, which can be understood by referring to the specification, drawings, and claims. In accordance with one aspect of the invention, a method is described for measuring the jitter experienced by an application running on a computer, the measurement based solely on the packets sent or received by the application itself. The method introduces no packets of its own into the packet flow.

The jitter measurement method does not alter the application's packets, in particular, it does not add a timestamp to the packets before they are sent. Instead, it creates a table that stores unique identifiers of the application's packets along with the time the packets are sent. On the receiving computer, a similar table is created that stores the unique packet identifiers along with the time the packets are received. Again because the jitter measurement method does not alter the application's packets, the unique packet identifier is based on information already present in the application's packets.

Records of sent packets are associated with records of received packets so that the time a packet was sent can be compared to the time the same packet was received. In the case of IP networks, the unique packet identifier rolls over back to zero after every 64k packets sent by the computer so some processing is necessary before the association can be made. That processing is useful in resolving the problems of lost packets and of packets received in an order different from the one in which they were sent. The processing also helps to lessen the burden of searching for associated packet records.

Once the send and receive times are associated in accordance with the teachings of the present invention, the resulting information can be sent to the jitter measurement tool described in U.S. patent application Ser. No. 091537, 995, "Method and System for Accurately Calculating Latency Variation on an End-to-End Path in a Network." That tool calculates the network jitter and the packet loss ratio which can then be reported to the user.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 6 through 9 represent packet information maintained or normalized and maintained in accordance with an aspect of the present invention;

FIG. 19 is a data structure diagram showing the packet records that may be stored in the sender and in the receiver timestamp buffers;

FIG. 20A is a data structure diagram showing the packet records stored in the sender timestamp buffer following an illustrative jitter measurement test;

FIGS. 20B through 20E are data structure diagrams showing how the packet records stored in the receiver timestamp buffer may be sorted to put them into the order in which the packets were sent;

FIG. 22 is a data structure diagram showing the results of associating the sent packet records with the received packet records.

DETAILED DESCRIPTION OF THE INVENTION

The following description is based on possible embodiments of the invention and should not be taken as limiting the invention in any way. The first section presents an exemplary hardware and operating environment in which the present invention may be practiced. The next two sections describe network jitter and present one way to measure jitter. These two sections are based on U.S. patent application Ser. No. 09/537,995, "Method and System for Accurately Calculating Latency Variation on an End-to-End Path in a Network." The final section builds on the previous sections, describing aspects of the present invention as another method for measuring network jitter.

Overview of a General-Purpose Computer

Figure 1:
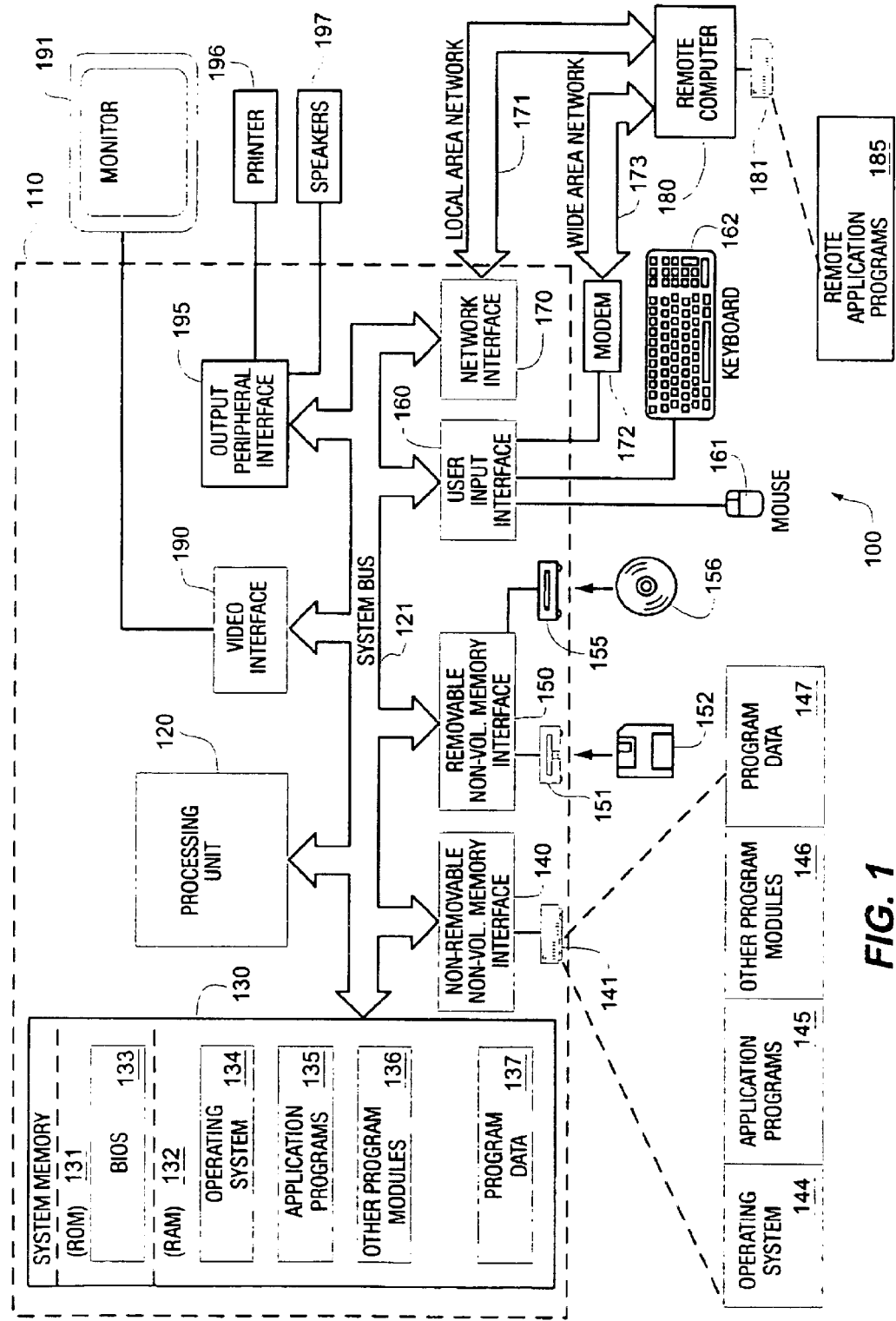
FIG. 1 is a block diagram generally illustrating an exemplary computer system that may support the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include volatile/nonvolatile and removable/non-removable media. By way of example, and not limitation, computer-readable media may include computer storage media and communications media. Computer storage media include volatile/nonvolatile and removable/non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to application programs 135 by way of one or more application programming interfaces (APIs) (not shown). Because the operating system 134 incorporates these services, developers of application programs 135 need not redevelop code to use the services. Examples of APIs provided by operating systems such as Microsoft's "WINDOWS" are well-known in the art.

The computer 110 may also include other removable/non-removable, volatile/nonvolatile computer storage media By way of example only, FIG. 1 illustrates a hard disk drive 141 that reads from and writes to non-removable, nonvolatile magnetic media, a magnetic disk drive 151 that reads from and writes to a removable, nonvolatile magnetic disk 152, and an optical disk drive 155 that reads from and writes to a removable, nonvolatile optical disk 156 such as a CD ROM. Other removable/non-removable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user input interface 160 that is coupled to the system bus, but may be connected by other interface and bus structures, such as a parallel port, game port, or a Universal Serial Bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Measuring Latency Variation (Jitter)

The present invention is directed to measuring latency variation on networks, including production networks and controlled networks that may be artificially congested. Note that as described below, the actual latency between sender and receiver is not measured, but rather the variable delay component, which is considered indicative of queuing delays and network congestion effects, may be determined on a per-packet basis. Moreover, the measurement may be conducted on devices in the network under test that are providing quality of service (QoS) through any number of QoS mechanisms, or may be conducted on devices that are not providing quality of service at all. As will be understood, this enables the benefits of QoS to be quantified in a manner relative to non-QoS systems.

Figure 2:
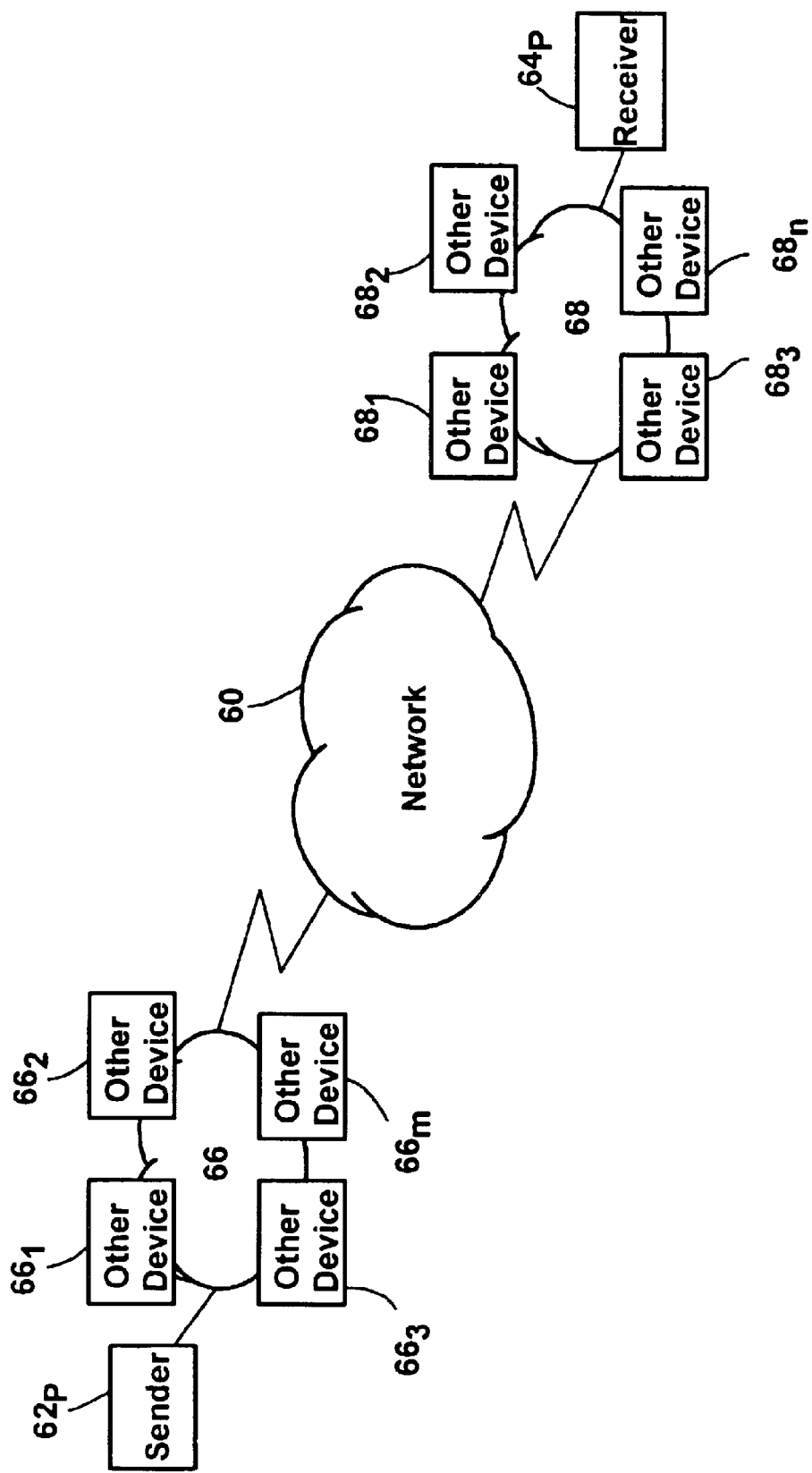
FIG. 2 is a block diagram generally representing a production network in which a sender and a receiver may conduct a test session in accordance with an aspect of the present invention.

FIG. 2 illustrates a production network 60 wherein the measurement tool of the present invention may be used. In FIG. 2, a sender $62_p$ and a receiver $64_p$ (where subscript "P" indicates "Production") are located at opposite ends of a network, each of which is running a corresponding part of a test session (described below). The network may be any network, wired or wireless or a combination of technologies, from a home LAN to the Internet. The network under test is a production network 60, in which other devices $66_l$ through $66_m$ and $68_l$ through $68_n$ compete with the sender and receiver session for network resources. Note that in this scenario, the user of the measurement tool has no control over the current network load.

Figure 3:
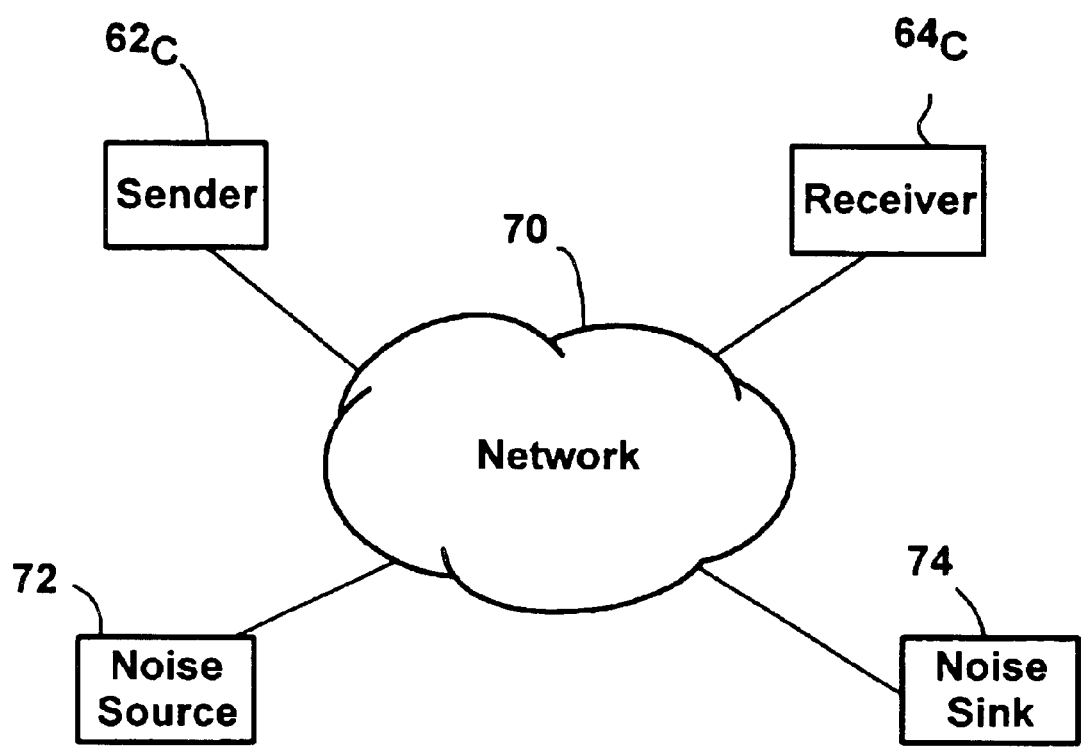
FIG. 3 is a block diagram generally representing a controlled network selectively influenced by a noise source and a noise sink, in which a sender and receiver may conduct a test session in accordance with an aspect of the present invention.

FIG. 3 generally illustrates a controlled network 70 in which the measurement tool of the present invention may be used, wherein a session-enabled sender $62_c$ and a receiver $64_c$ (where subscript "C" indicates "Controlled") are located at the opposite ends of the network 70 under test. In controlled network scenarios, the network under test 70 tends to be smaller and simpler, to facilitate the evaluation of specific network elements in isolation. For example, unlike the production network 60 (FIG. 2), in the controlled network 70 of FIG. 3, there are only four hosts attached to this network, two of which comprise the sender $62_c$ and receiver $64_c$ that are running the test session, while the other two hosts act as a noise source 72 and noise sink 74. In these types of tests, the user controls the amount of noise (other packets that provide congestion) artificially generated from the noise source 72 across the network to the noise sink 74 during any specific test run. For example, noise sources 72 are selected to mimic the distribution of packet sizes and the traffic level that would be encountered on a production network.

A measurement tool may be used to measure, on a per-packet basis, end-to-end network integrity and service quality for the verification of QoS. To this end, the measurement tool on a sender 62 sends a sequence of test packets through its network to the corresponding receiver 64, and then reports on the queuing delay experienced by each packet. Packets are marked with a sequence number at the sender such that packets that do not arrive at the respective receiver are recorded as dropped packets. The sequence numbers are thus unique, at least per session.

Figure 4:
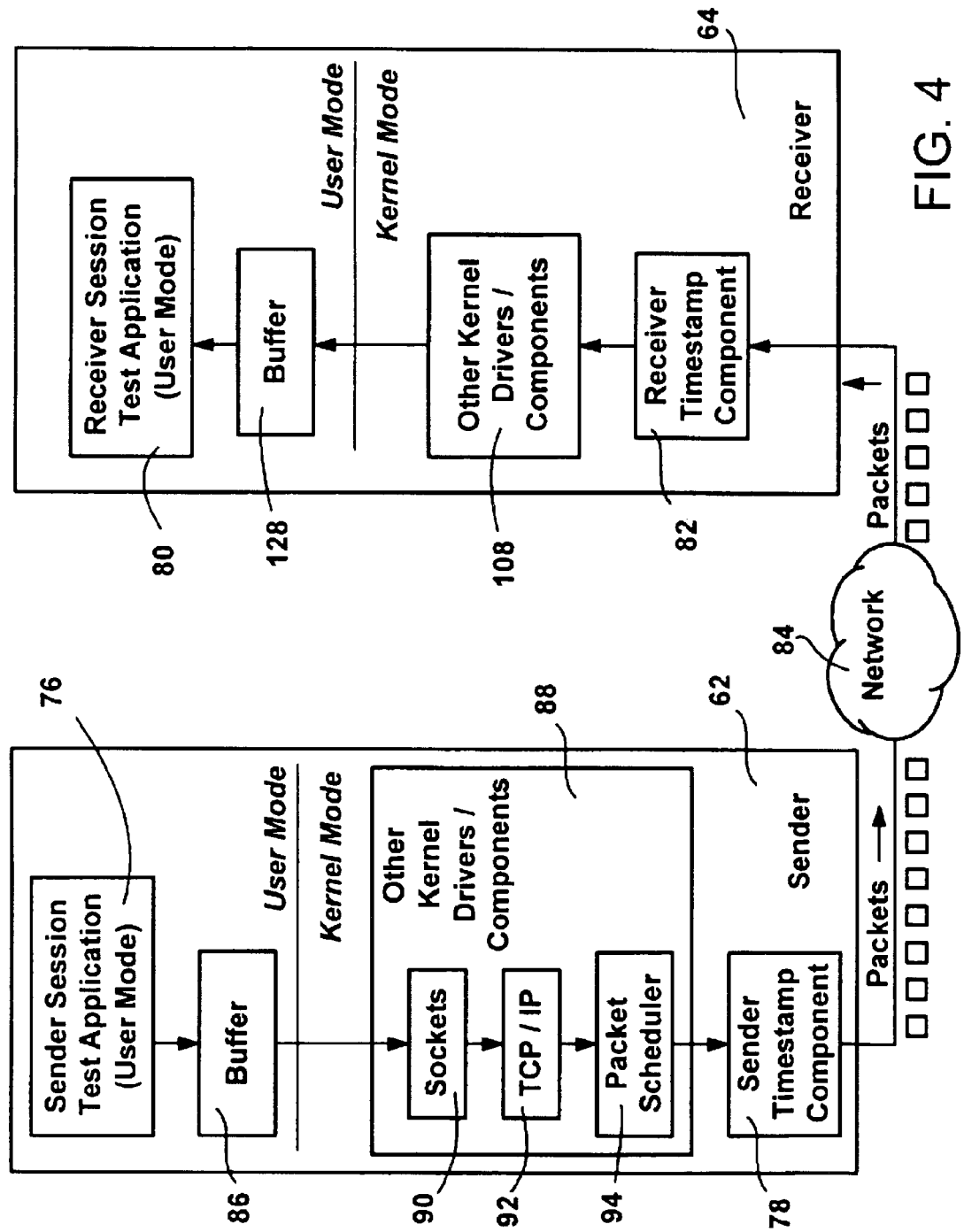
FIG. 4 is a block diagram generally representing components in a sender and receiver for sending packets during a test session.
Figure 5:
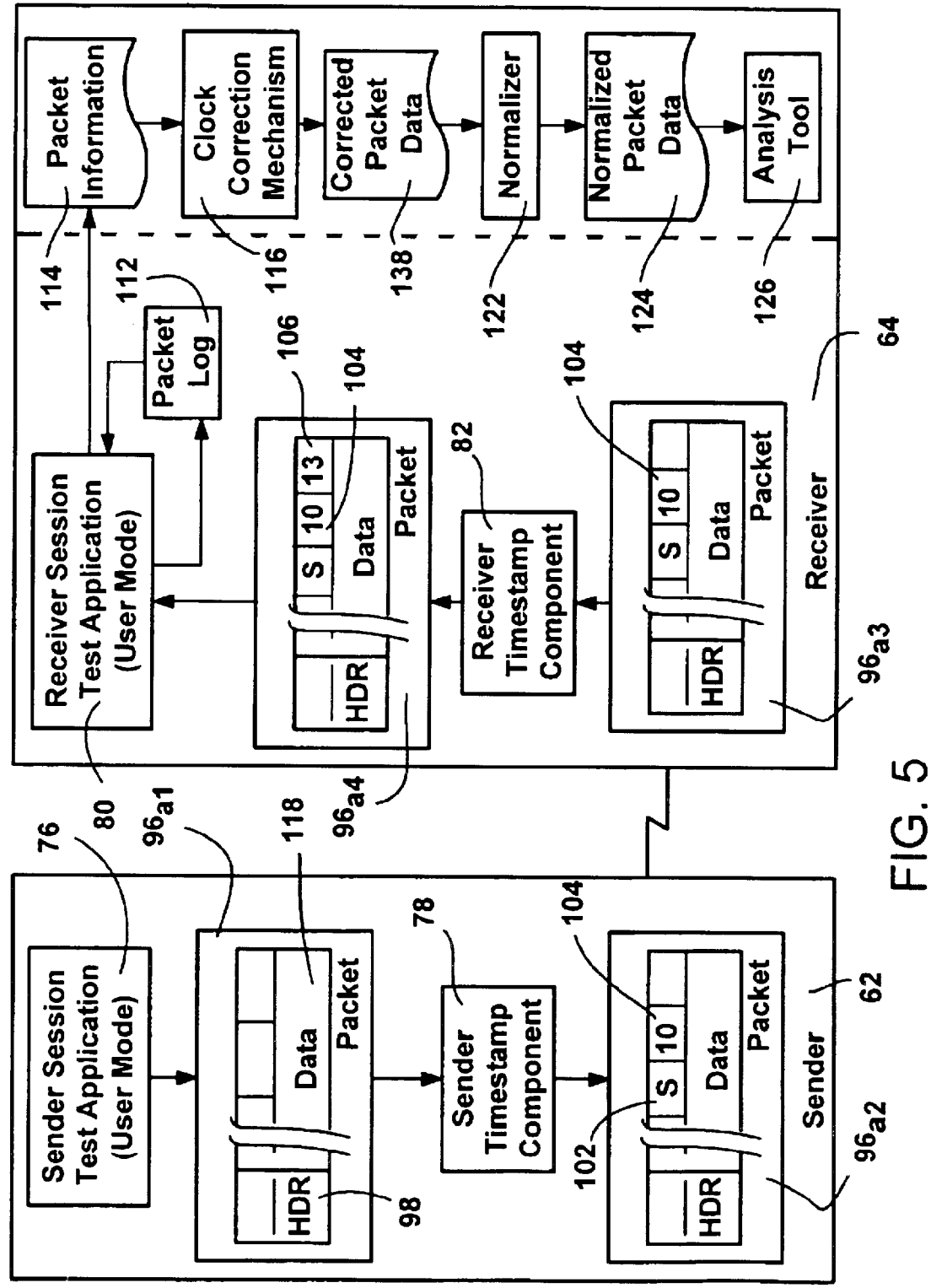
FIG. 5 is a block diagram generally representing components for associating timestamps with packets.

As generally represented in FIGS. 4 and 5, the measurement tool comprises a session portion in a sender 62, including a user-mode test application 76 along with a kernel-mode timestamp component 78, and a session portion in a receiver 64 including a user-mode test application 80 along with a kernel-mode timestamp component 82. The network 84 shown in FIGS. 4 and 5 may be a production network or a controlled network, or possibly some hybrid of both.

To run the session, a measurement tool session is invoked on both a sending host 62 and a receiving host 64 via the applications 76 and 80. By default, the measurement tool invokes network QoS and is useful for evaluating QoS mechanisms, and various parameters are adjustable. For example, the measurement tool can be varied to simulate traffic flows for a range of user selectable packet sizes, and can simulate traffic flows shaped to a range of token bucket parameters.

Upon invocation, the measurement tool uses the GQoS application programming interface (API), which is part of Winsock2, to invoke QoS from local traffic control and from the network 84. One QoS signaling protocol is RSVP (Resource Reservation Protocol), which works over TCP/IP. RSVP applications can use RSVP messages to request quality of service from the network and to indicate QoS requirements to the network and to peer applications. As currently defined, RSVP uses Integrated Services (Intserv) semantics to convey its QoS requirements to the network.

RSVP messages follow the path of the traffic for which resources are being requested, whereby messages arrive at the devices whose resources will be utilized by a successful reservation, i.e., by admission of a flow. This provides admission control based on the current resources available in the affected devices, that is, RSVP-aware devices understand the applicability of RSVP requests to their specific media, and are able to accept or reject the messages based on their resources and ability to support the requests. Standard RSVP messages typically carry a quantitative description of the relevant QoS traffic in parameters referred to as token-bucket parameters (in Intserv semantics). RSVP is well-documented and is not described in detail herein for purposes of simplicity.

In The measurement tool sender application 76 begins by causing an RSVP PATH message to be sent by the sender 62 towards the receiver 64 and waits until a response is received from the measurement tool receiver application 80. When received, the measurement tool receiver 80, which is awaiting an RSVP PATH message from the sender 62, responds by transmitting an RSVP RESV message back to the sender application 76.

Receipt of the RESV message at the sender application 76 triggers the measurement phase of the measurement tool application 76. To this end, the sender begins submitting one or more buffers (e.g., the buffer 86 of FIG. 4) to kernel-mode components 88 for transmission. Such components 88 typically include a sockets driver 90, a TCP/IP driver 92, and a packet scheduler 94. The kernel paces the transmission of traffic according to the token bucket parameters and service type selected by the user via the measurement tool application 76 (e.g., entered by a user via a command line).

As packets are transmitted, the timestamp component 78 associates a sequence number and a sender-relative (local) time (e.g., to a precision of 100 nanoseconds) with each packet. More particularly, as represented in FIG. 5, a typical packet $96_{a1}$ includes some header information 98 and a data section 118. The timestamp component 78 modifies the packet $96_{a2}$ by writing a sequence number ("S" in FIG. 5), e.g., into a data field 102 and by writing the send timestamp (shown in FIG. 5 as the simplified whole number ten (10), but in actuality the current system tickcount) at one predetermined offset, e.g., in a send time data field 104. The timestamp component 78 is installed below the other kernel-mode components 88, which, as will be understood, eliminates from consideration any transmission delay caused by higher components, thereby providing a more accurate time of actual send. If the timestamp component is not installed, the measurement tool may use a user mode timestamp component (e.g., in the test application 76), however, this is less accurate than having the kernel-mode component 78. Further, note that in one alternative, instead of actually stamping the packets, the sender can associate the timestamps with each packet locally, such as in a file or the like, and then later send the file to the receiver 64, from which the receiver application 80 can match the timestamp information with received packets (e.g., by sequence number).

When each packet is received at the receiver 64, the receiver timestamp component 82 associates the packet with the local time therein. Thus, as shown in FIG. 5, when received, the receiving host 64 stamps the packet 96$_{a3}$ at a different data offset, e.g., at a received timestamp field 106, with the receiver's local timestamp (shown in FIG. 5 as the simplified whole number thirteen (13)). The stamped packet 96$_{a4}$ is then passed through other kernel drivers 108 up to the receiving measurement tool peer application 80, e.g., via a buffer 128 (FIG. 4). Again, the receiver timestamp component 82 is preferably installed below the other receiver kernel-mode components 108 to eliminate from consideration any transmission delay caused by higher components and thereby provide a more accurate (local) time of actual receipt. Also, as with the sender timestamp, the receiver timestamp component 78 can associate the timestamps with each packet in another way, such as by writing the local receiver timestamp in a file, and then later matching the timestamp information in the file to each appropriate received packet.

As represented in FIG. 5, the receiving measurement tool application 80 adds each received packet to a log 112 of all received packets, including the packet sequence number, the time sent, and the time received. The test terminates on the sending side when the sender 62 has sent a predetermined number of packets (a default number of packets is 2048, however the default number may be overridden, e.g., via a command line that runs the measurement tool). The sender 62 and receiver 64 may negotiate this number.

Following transmission of the last packet, the sender 62 sends a terminating sequence of (e.g., ten) 'termination' packets. The test terminates on the receiving side upon receipt of a termination packet or upon receipt of the required number of packets. Note that, on particularly congested links, the receiver 64 may never receive the required number of packets and the termination packets may be dropped. In this case, the receiver application 80 may be terminated by some other mechanism, e.g., a 'DONE' message received via a TCP control channel, or may be terminated manually.

Upon termination, the receiver application 80 parses and processes the log 112 of received packets. Note that after collecting the raw packet data 112, the receiver application 80 may perform this parsing/processing, and other post-processing operations described below, or alternatively, some or all of these actions may be performed by separate components (as logically represented in FIG. 5). In any event, parsing and processing preferably provide summary statistics, for example, the total number of packets received and the sequence number of each dropped packet, and these statistics are maintained in one or more files of packet information 114. Also preferably maintained in the file or files 114 is detailed information for each packet including a send time and receive time, which may be normalized, the latency (difference between sent and received time), which also may be normalized, the packet size, and the sequence number. Normalization is described below.

In this manner, the measurement tool generates detailed result logs and is able to report very precise delay variations, on the order of microseconds or better.

After the packets have been transmitted and received (that is, those not dropped), a second phase of the measurement tool may process the list of sent and received times to perform normalization. A clock correction mechanism 116 may first be employed to correct for certain hardware anomalies, described below, in which event corrected packet data 138 are used. A normalizer process 122 is then employed to normalize the data as desired.

To normalize, the lowest sent timestamp (which should be the first) is located, along with the lowest difference between sent time and received time across all pairs of timestamps, i.e., the lowest latency. These values are recorded. The lowest send time is then subtracted from other send times.

Note that in the examples described herein, simplified (whole number) timestamps are used, and the received timestamps are always later than sender timestamps (although straightforward logic is implemented to allow for the case in which the receiver's timestamps are actually earlier than the sender's timestamps).

By way of example, consider the following table of timestamps, also shown in the table 1281 of FIG. 6:

| Time Sent | Time Received | Latency |
|---|---|---|
| 10 | 13 | 3 |
| 11 | 19 | 8 |
| 12 | 18 | 6 |
| . | . | . |
| . | . | . |
| . | . | . |

Upon parsing these records, it is determined that the lowest send time is ten (10) and the lowest latency is three (3). The lowest send time of ten is then subtracted from all sent timestamps, which has the effect of normalizing the first packet's send timestamp to zero and each following packet's timestamp to the difference between the time that the first packet was sent and the time the following packet was sent. After the first normalizing step, the table looks as follows (as also shown in table 1282 of FIG. 7):

| Time Sent | Time Received | Latency |
|---|---|---|
| 0 | 13 | 3 |
| 1 | 19 | 8 |
| 2 | 18 | 6 |
| . | . | . |
| . | . | . |
| . | . | . |

During the next normalizing step, the lowest send time is subtracted from all received time stamps, yielding the following results (as also shown in table 1283 of FIG. 8):

| Time Sent | Time Received | Latency |
|---|---|---|
| 0 | 3 | 3 |
| 1 | 9 | 8 |
| 2 | 8 | 6 |
| . | . | . |
| . | . | . |
| . | . | . |

In a last normalizing step, the lowest latency is subtracted from the received time stamps and each latency is updated to reflect the difference between the normalized send and receive timestamp pairs. Note that this corresponds to subtracting the lowest latency from each latency. This yields the following results (as also shown in table 1284 of FIG. 9):

| Time Sent | Time Received | Latency |
|---|---|---|
| 0 | 0 | 0 |
| 1 | 6 | 5 |
| 2 | 5 | 3 |

-continued

| Time Sent | Time Received | Latency |
| --- | --- | --- |
| . | . | . |
| . | . | . |
| . | . | . |

Note that the first packet shows a latency of zero; however, this does not mean that the transmission delay is zero. Rather, it means that this packet's delay represents the best case or fixed delay that occurs between sender and receiver. Normalized latencies that are greater than zero indicate the amount of delay beyond the fixed delay or beyond the minimum delay. As such, these latencies represent the variable delay component that results from queuing and congestion, which, as can be readily appreciated, is ordinarily more interesting than the fixed delay component from the perspective of network a congestion analysis.

As is understood from the above, no attempt is made to determine the actual latency between sender and receiver; only relative latency, i.e., the variable delay component, is determined, which is indicative of queuing delays and network congestion effects. Note that this approach will not always yield valid results, as it is based on the assumption that there is one latency that is indicative of the fixed delay component of the network. This can be accomplished by a calibration phase if the network under test is a controlled (isolated) network. More particularly, if the network is controlled exclusively by the tester, then the lowest latency can (and should) be calibrated. To this end, during the calibration phase, no noise should be generated on the network. This assures that queues in network devices will be empty and that the minimal latency logged will indeed be indicative of the fixed delay component of the network. Noise is introduced following the calibration phase.

Alternatively, if a large enough number of packets is sent during a test run, then it is statistically very likely (even in production networks) that at least one of the packets will end up in a very short (or zero length) queue and will not be subjected to congestion delay. The minimum delay used in the calculation will be the delay experienced by this "best case" packet. This assumption fails on a heavily congested network in which queues never drop to zero length, however.

Once the various sets of information have been normalized, analysis is simplified, and the data may be manipulated as desired to determine, for example, what happened to each packet on the network, the benefits of QoS, and so forth. For example, the various latencies may be plotted against the send times, for tests with and without QoS enabled. Note that once the raw packet data 112 are logged, the manipulation and analysis of the data need not be performed at the receiver and can be performed at any time or by some other process, as indicated in FIG. 5 by the dashed line separating the post-packet collection components 114 through 126.

Figure 10:
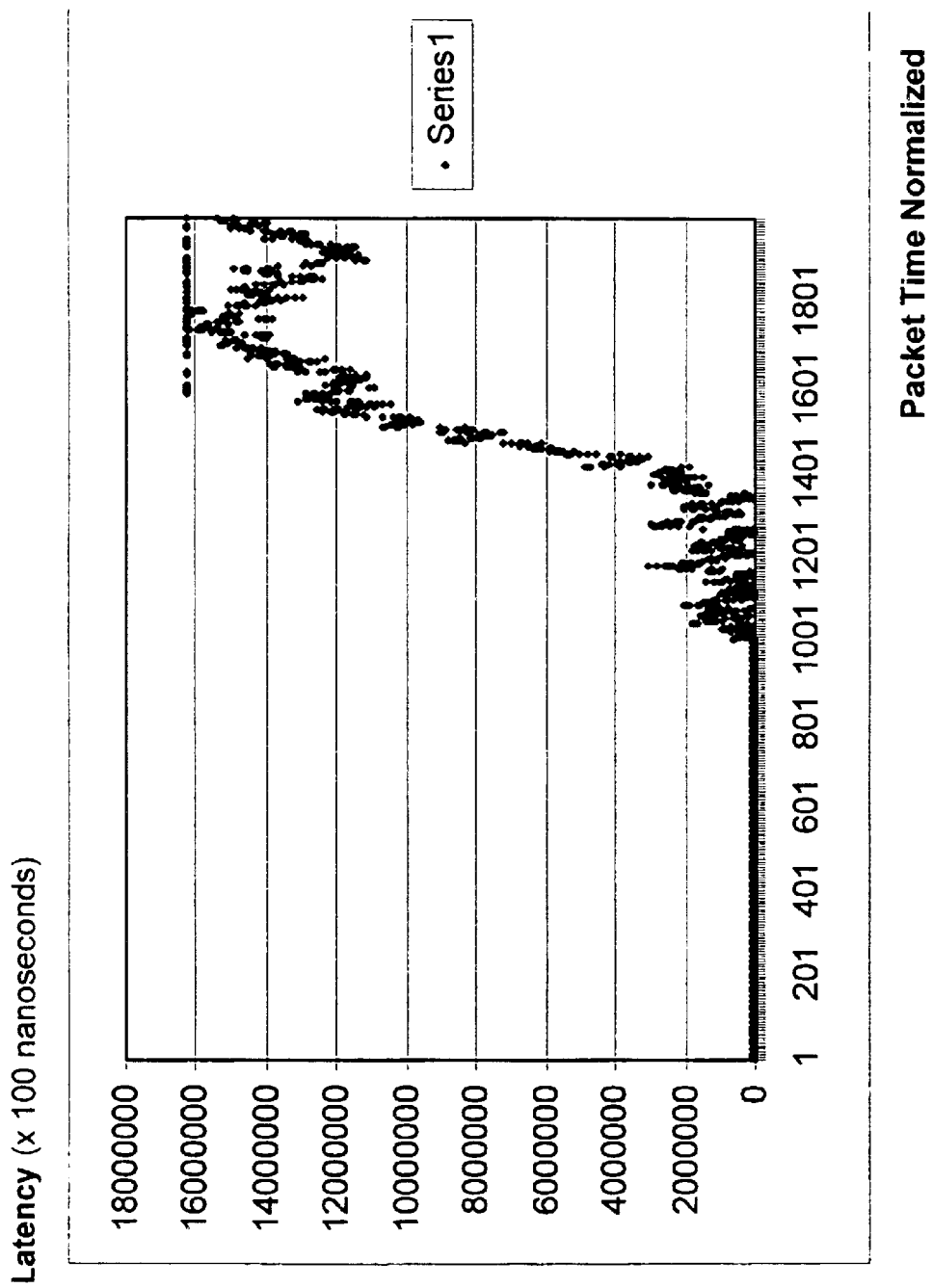
FIG. 10 is a graph of per-packet latency information in a controlled network with QoS mechanisms disabled.
Figure 11:
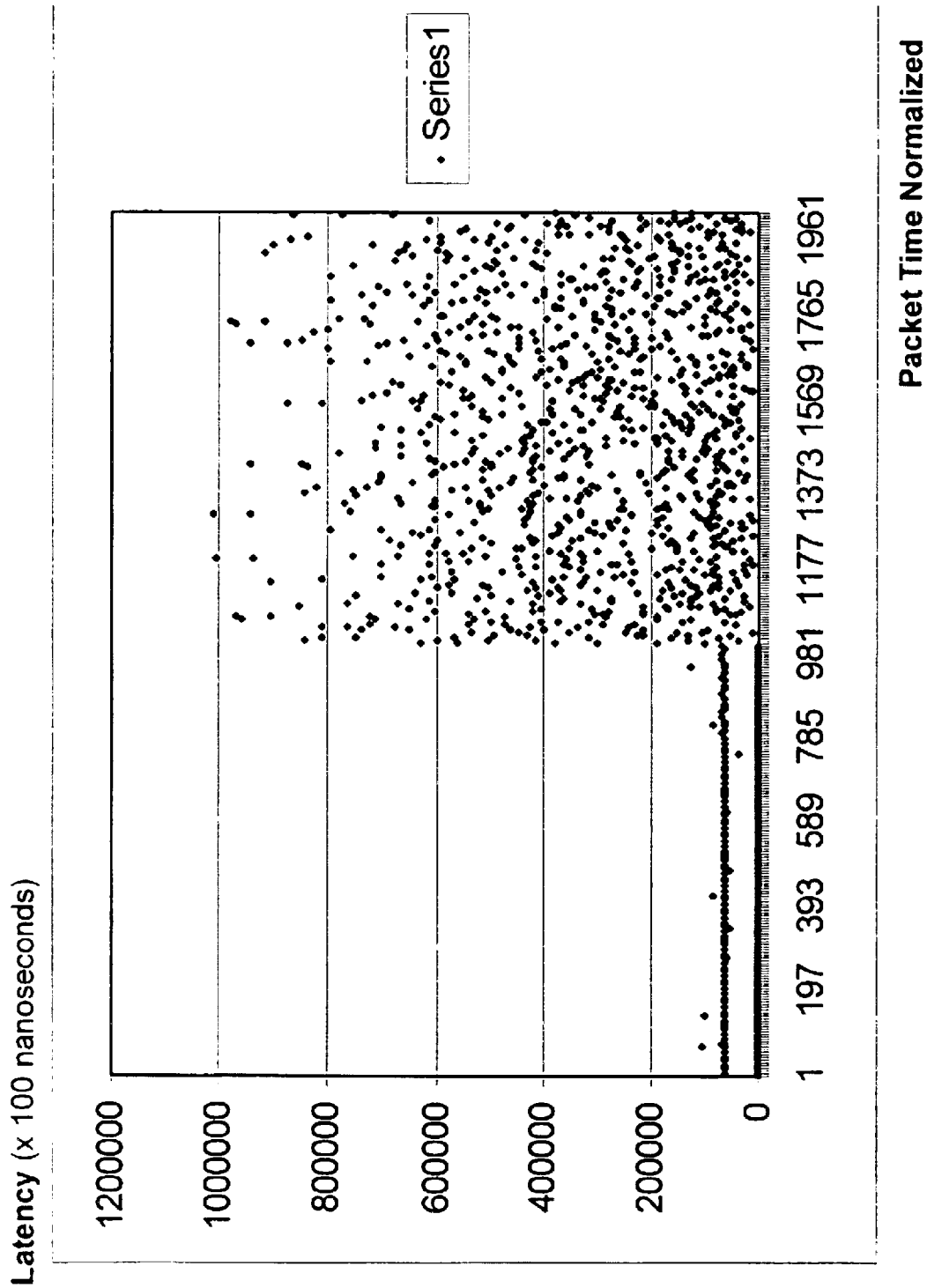
FIG. 11 is a graph of per-packet latency information with QoS mechanisms enabled.

Two examples of sample data for test trials measured via the present invention are shown in FIGS. 10 and 11. Both trials were run across an isolated network consisting of two RSVP-capable routers connected by a 128 Kbps serial line. Each router was also equipped with an Ethernet interface. The sender was connected to one of the router's Ethernet interfaces, and the receiver was connected to the other. In addition, the sending port of a 'Smartbits' noise generator was connected to the same Ethernet network as the sender. The receiving port of the noise generator was connected to the same Ethernet network as the receiver. The noise generator was programmed to send 100 Kbps of noise traffic from its sending port to its receiving port such that the traffic generated by the noise generator would compete with the traffic generated by the test session for resources on the 128 Kbps link. The noise generator was programmed to generate a mix of packet sizes that simulated the typical load on a real corporate WAN link. The test session was invoked in a manner intended to simulate a telephony traffic flow. The parameters were set to result in a test traffic flow of 64-byte packets sent at a rate of 24 Kbps.

The purpose of the test was to examine the utility of RSVP in protecting the signal flow on a WAN link driven to near saturation. To this end, the first trial (which resulted, in FIG. 10) was run without RSVP enabled on the routers. The second trial (which resulted in FIG. 11) was run with RSVP enabled on the routers. In both cases, RSVP signaling was used between the sender and receiver. The X-axis represents the packet sequence number, while the Y-axis represents the normalized latency in units of 100 nanoseconds.

Note that FIGS. 10 and 11 are not drawn to the same scale, as the y-axis of FIG. 10 ranges from zero to 1.8 seconds, while the y-axis of FIG. 11 ranges from zero to 0.12 seconds (indeed, the entire display of FIG. 11 would approximately fit below the halfway point of the 2,000,000 label of FIG. 10). As can be appreciated, the measurement tool provides detailed information that quantifies the benefits of QoS.

Clock Skew and Other Hardware Anomalies

As mentioned above, the raw latency data may be subject to hardware problems, which, if left uncorrected, would adversely influence the results. One such problem results from a "bug" in a commonly used timer chip, wherein the HAL timer in a machine jumps forward in certain scenarios. As represented in the simplified graph of latencies against sent times of FIG. 12, the bug that causes jumps in a clock can lead to jumps in the relative latencies that do not accurately reflect the true latency differences. Indeed, the detailed information provided by the measurement tool application was originally responsible for detecting this bug (subsequently diagnosed as an incorrectly set bit) in the particular timer chip. The detection and correction of the timer jump problem are described below with respect to FIGS. 15 through 17, in which the jumps are detected and subtracted, leading to the simplified graph of latencies versus sent times of FIG. 13.

Another hardware-related problem is clock skew, in which crystal oscillator-based personal computer clocks are often subject to deviation from their nominal frequency. The deviation is on the order of several parts per million, and, as a result, clock skew measured between two contemporary personal computers may be on the order of ten microseconds per second.

As a consequence of clock skew, send timestamps and receive timestamps are generated based on clocks running at slightly different speeds. This leads to a result as generally represented in the simplified graph of FIG. 13, wherein the later in time that a packet is received, the greater (if the receiver clock is losing time with respect to the sender clock) the corresponding raw relative latency will be. Conversely, if the receiver's clock is gaining on the sender's clock, the later a packet is received in a session the shorter the relative latency will appear to be, resulting in a negatively-sloped line (not shown). When measuring queuing delays on the order of milliseconds over a period of seconds or minutes, the skew between the sending oscillator's rate and the receiving oscillator's rate is negligible. However, when measuring queuing delays that are much lower (such as on a high speed LAN) or when measuring delays over a long period of time, the clock skew may become significant.

Figure 14:
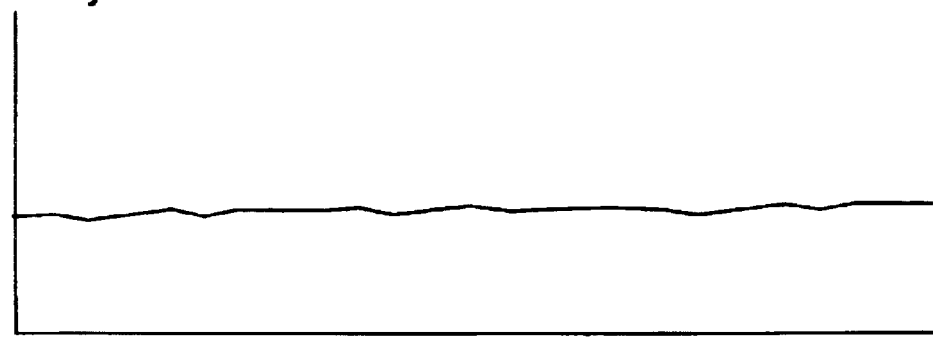
FIG. 14 is a simplified representation of a graph representing latency information over time wherein timer jumps and clock skew are not present.

To compensate for the clock skew, the timestamps are first normalized by factoring out the increase or decrease in slope over time. This step is based on the assumption that the clock skew is constant, while queuing delay is variable. In order to normalize for the effects of clock skew, the latency reports are fitted to a constant slope line. There are multiple possible statistical methods for this clock skew normalization. In one method, the sum of squared error as the goodness of fit measure is fit to a straight line (which makes an implicit assumption that latency is normally distributed). Another method uses absolute deviation as the goodness of fit measure (wherein the assumption is that latency is more like a double exponential about the mean). As can be readily appreciated, other statistical methods provide acceptable results. Once the slope is determined, any constant variation in latency is removed from the resulting timestamps, which, if then plotted, would generally result in the simplified, essentially zero-slope graph of FIG. 14. Note that this slope normalization should be performed after correction for any timer jumps, otherwise timer jumps would affect the slope.

Figure 15:
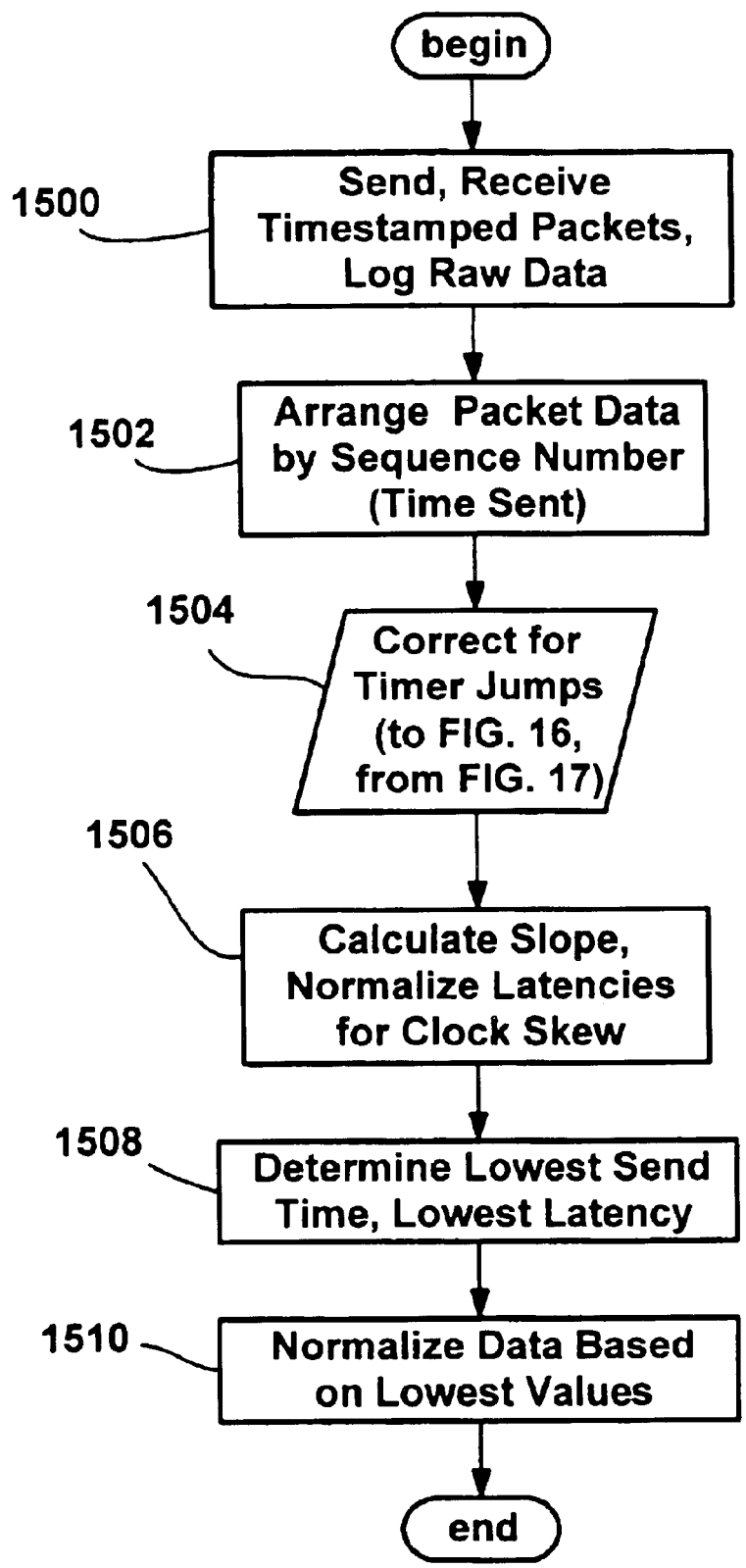
FIG. 15 is a flow diagram generally representing steps for performing a session and for handling the packet information received.
Figure 16:
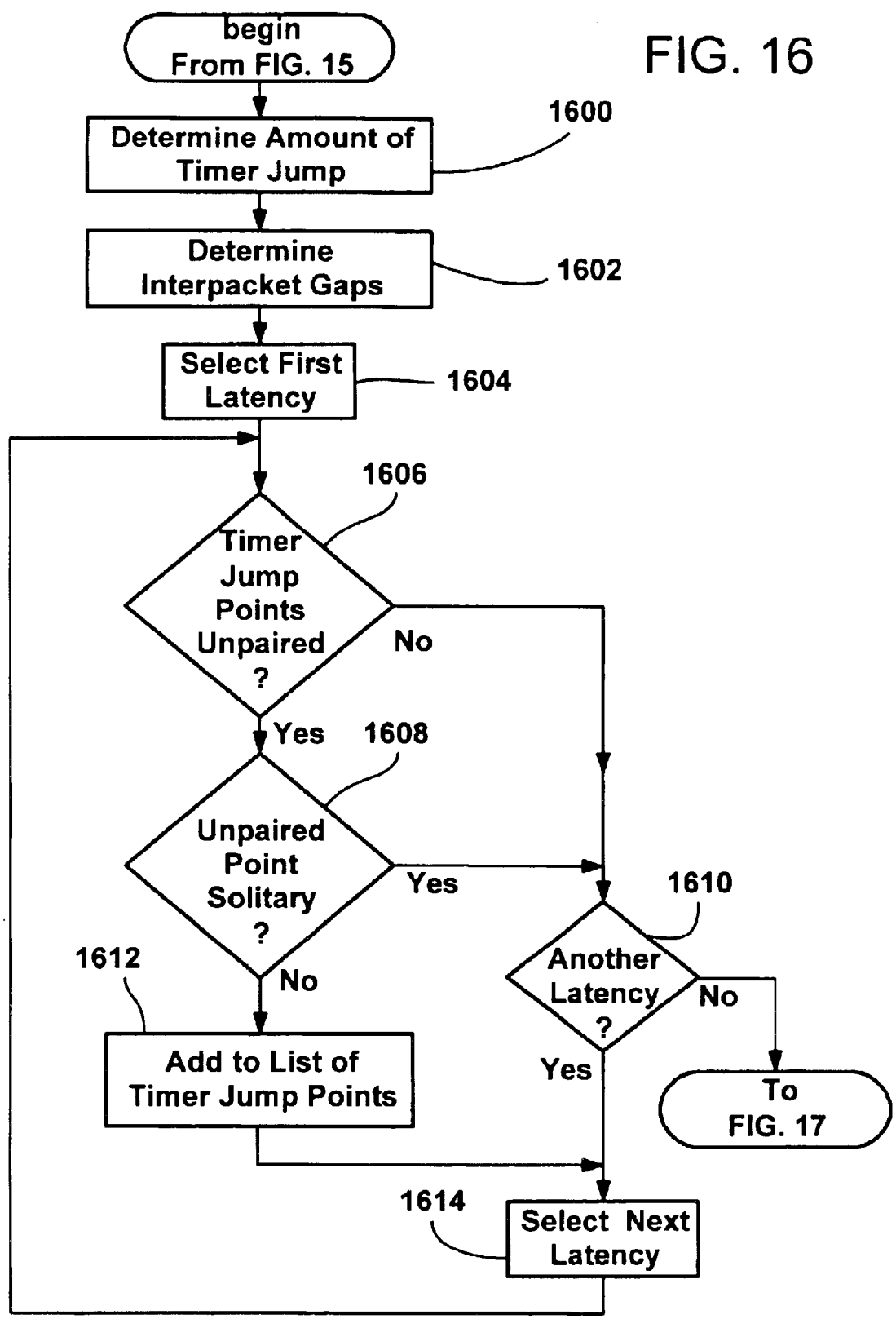
FIGS. 16 and 17 comprise a flow diagram generally representing the steps for correcting timer jumps.
Figure 17:
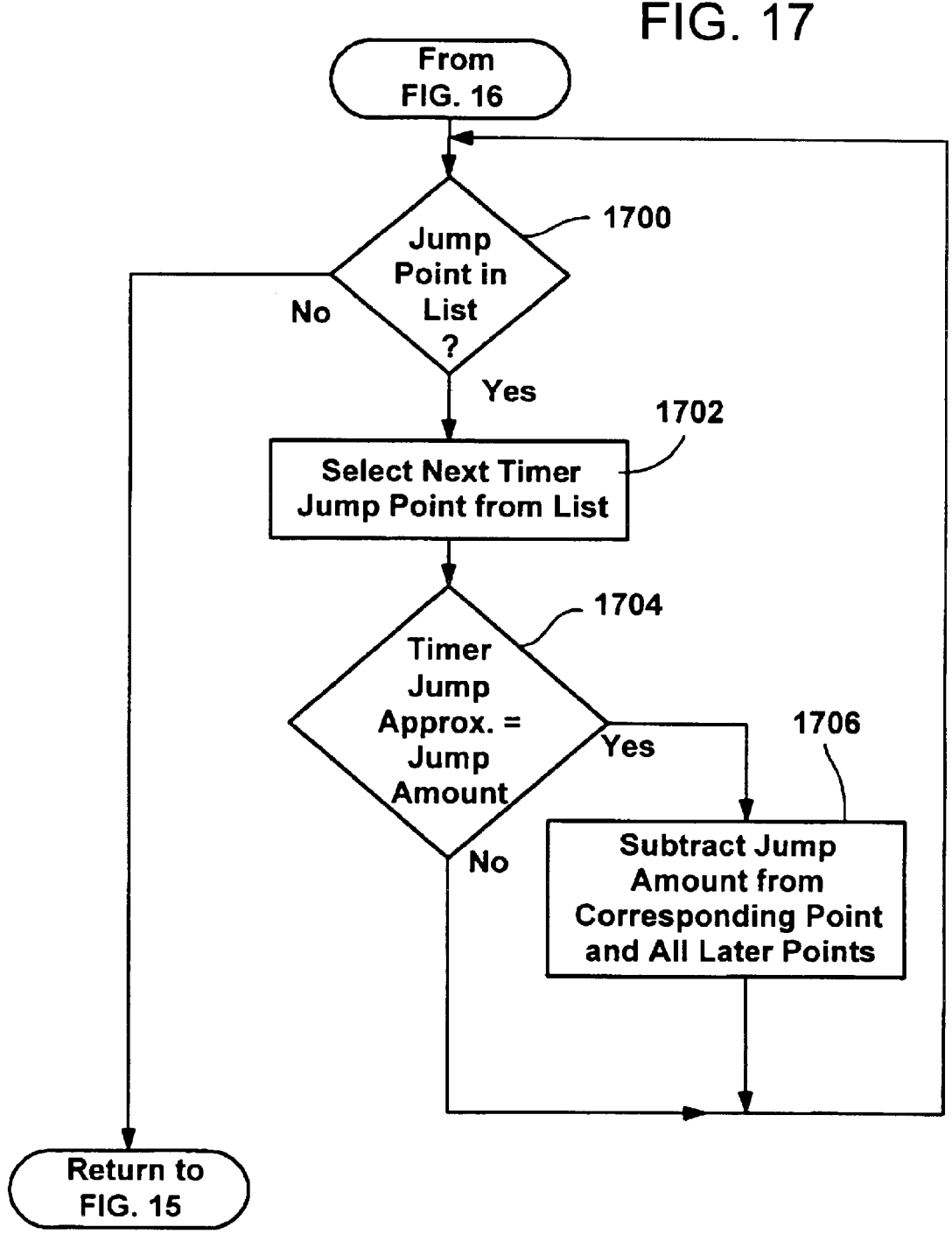

Turning to an explanation of the operation of the present invention with particular reference to the flow diagrams of FIGS. 15 through 17, a session operates as generally represented in step 1500, by transmitting timestamped packets, stamping those packets on receipt, and then logging the information in those packets as described above. At step 1502, the packets are arranged by sequence number (which should generally correspond to time sent). When transmission and receipt are complete, some time later at step 1504 the post-collection process begins by continuing to step 1600 of FIG. 16 to check for timer jumps. Of course, timer jump checking need not be performed for sessions wherein it is known that neither the sender nor the receiver includes a faulty timer chip.

Step 1600 determines the amount of timer jump. This is accomplished in a Windows® 2000/Windows NT® system from the operating system kernel by calling an API known as the QueryPerformanceCounterFrequency API. At step 1602 the interpacket gaps on both the sender and receiver are determined. Also, note that latencies which are at least a fixed number of standard deviations away from the mean are referred to as "timer jumps." Step 1602 selects the first latency to begin walking through the latencies to look for timer jumps.

Step 1604 checks to determine if any "timer jump" points are unpaired, that is, a suspected timer jump point in the set of sending timestamps is not matched with an equally suspect point in the set of receiving timestamps. If not, step 1606 branches ahead to step 1610, which selects the next latency at step 1614 (or branches to FIG. 17 if there are no more) to repeat the test on the next latency.

If the suspected timer jump point is unpaired, step 1606 instead branches to step 1608 wherein it is determined whether the potential "timer jump" unpaired point is solitary (that is, it is not surrounded by other suspect points). If so, this indicates a likely timer jump, otherwise it is likely an isolated incident. Via the last test at step 1608, if a point is found that meets the above criteria, it is labeled as a timer jump point and added it to a list of timer jump points. When the points have been evaluated, step 1610 branches to step 1700 of FIG. 17.

Figure 12:
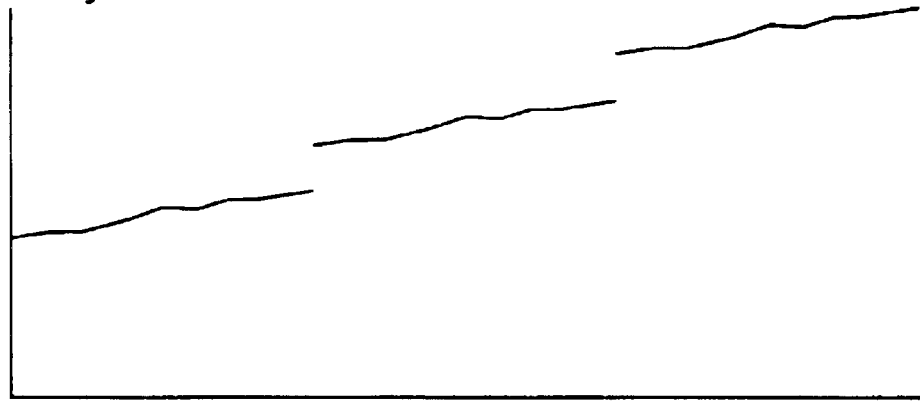
FIG. 12 is a simplified representation of a graph representing latency information versus time wherein timer jumps and clock skew are present.
Figure 13:
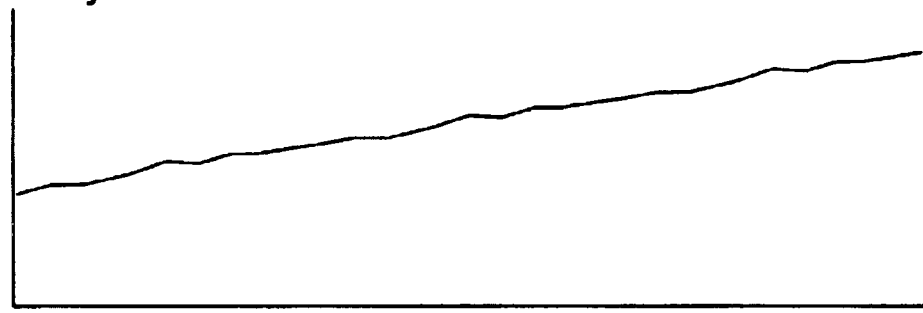
FIG. 13 is a simplified representation of a graph representing latency information over time wherein clock skew is present.

Step 1700 begins walking through the timer jump point list built in FIG. 16. If any point is listed, the point is selected at step 1702 and checked to see if the suspect timer jump point is approximately equal to the amount of timer jump returned via the QueryPerformanceCounterFrequency API. If not, this suspect point is discarded at step 1704, otherwise step 1704 branches to step 1706 wherein the jump amount is subtracted from the point and from all points after it (since once the timer jumps it counts further ticks relative to the jump amount). Step 1700 repeats the process until the timer-jump list is exhausted. As can be understood, by correcting for timer jumps, the "stepped" latencies represented in the simplified graph of FIG. 12 are thus brought back into alignment as generally represented in the simplified graph of FIG. 13.

Returning to step 1506 of FIG. 15, the slope is calculated using an appropriate statistical mechanism as described above, and the calculated slope is then used to correct the latencies for clocks skew. For example, the raw received times can be appropriately raised or lowered based on a factor determined from the calculated slope. At step 1508, the lowest latency is determined from the corrected values, essentially providing a truly-lowest latency value. Note that if the lowest send time has not yet been determined, it also may be determined at step 1508. At step 1510, the lowest latency is used to normalize the other latencies as described above, and, if necessary, the lowest send timestamp may be used to normalize the send and receive times as also described above. At this time, the per-packet information may be analyzed in a straightforward manner.

As can be seen from the foregoing detailed description, the measurement tool application accurately calculates latency variations on an end-to-end path in a network. The tool provides high resolution, per-packet reporting, is capable of measuring latency in one direction on networks including production and controlled networks, and does not require synchronization of system clocks.

Another Method for Measuring Jitter

The method described above is of limited utility for some applications because it relies on traffic generated by the measurement tool itself. Introducing that traffic into the network may distort the characteristics of network traffic so much that the resulting jitter measurements do not accurately indicate the conditions faced by an application. Also, the patterns of traffic generated by certain applications may be very complex and may not be well modeled by a tool that sends fixed-size packets at a fixed rate. The present invention, in brief, builds on the framework provided above but measures jitter using packets generated by applications themselves.

This is made difficult by the fact that the present invention cannot introduce a timestamp into a packet generated by an application. Instead, during a QoS jitter test, a table is created on the sender that correlates sent packets with the time that they are transmitted, as measured by the sender's clock. The receiver generates a similar table, correlating the received packets with the time they were received, as measured by the receiver's clock. The difficulty arises when the data in the two tables are merged (by sending one table to the other computer, or sending both tables to a third computer). The difficulty lies in associating a sent packet (with its transmission timestamp) with the same packet as received (with its reception timestamp). Once that association is made, the differences in the timestamps are recorded. The records produced can then be processed in a manner similar to that shown in the rightmost column of FIG. 5, items 114 through 126, and described in the flow diagram of FIGS. 15 through 17.

Collecting Data

Figure 18:
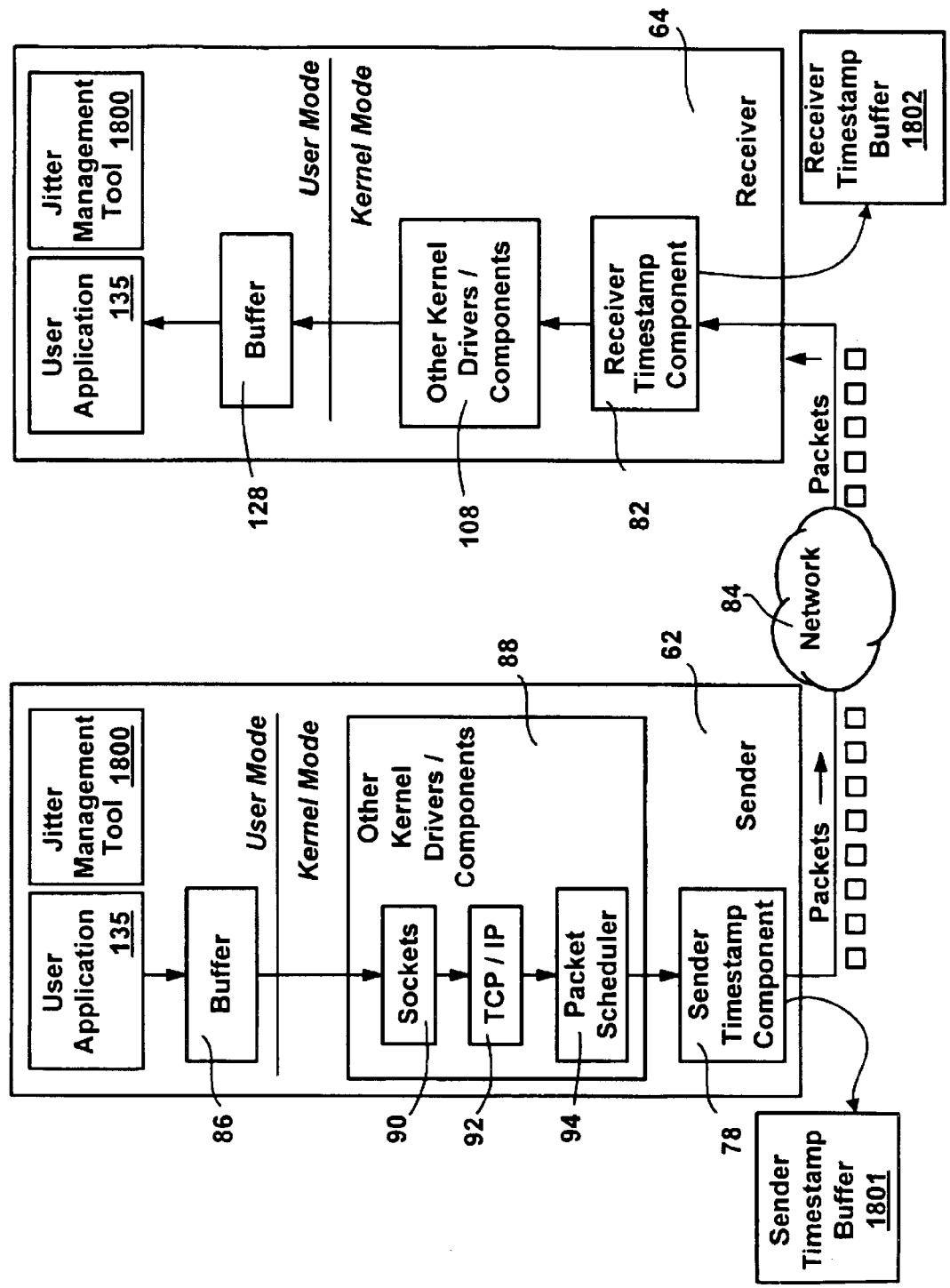
FIG. 18 is a block diagram of the components involved in one implementation of the present invention's jitter measurement method.

FIG. 18 is a block diagram of the components involved in one implementation of the present invention's jitter measurement method. It is analogous to FIG. 4, described in the preceding sections. Here, however, the jitter measurement method does not generate its own packets. The previous method's test application 76 is replaced by two components: the jitter management tool 1800 and the program whose jitter is to be measured. The jitter management tool presents to the user a list of the traffic flows, both incoming and outgoing, active on the local computer 62. Here, the user chooses to monitor the traffic flow generated by a user application 135. The monitored program may be a word processor, spreadsheet, or Internet browser, but it may also be any program that communicates over a network: the program needs know nothing about jitter measurement. For purposes of illustration, the application is shown as communicating with another application 135 on the remote computer 64. The jitter management tool also allows the user to delimit the jitter test and view test results. This tool may be a stand-alone application or may be incorporated into a more comprehensive network control API, such as that described in U.S. patent application Ser. No. 09/157,645, "Method and System for Abstracting the Interface with Network Communication Traffic Control Components," filed on Sept. 21, 1998.

When the user chooses to monitor traffic flows, the jitter management tool 1800 tells the local timestamp component 78 which traffic flows it should begin to monitor. For IP networks, traffic flows are uniquely identified by a quintuple of information discussed in the next section. For non-IP networks, an analogous unique traffic flow identifier can be developed. The information about which traffic flows to monitor is also sent to the jitter management tool running on the remote computer 64, in one embodiment by the Winsock API, and from there passed down to the receiver timestamp component 82.

In operation, the application 135 submits buffers 86 to kernel-mode components 88 for transmission. When the data in the buffers are packetized, the sender timestamp component 78 intercepts the packets and associates a packet identifier (described in detail below) and a sender-relative timestamp with each packet. The sender timestamp component does not alter the packet by writing the timestamp into it. Rather, it records the timestamp and the packet identifier as a packet record in the sender timestamp buffer 1801. The packet is then delivered to the receiver computer 64.

The sender timestamp component 78 is shown installed below the other kernel-mode components 88 so that its timestamps do not reflect latency caused by those higher-level components. This gives the measurement tool a more accurate picture of latency and jitter as produced by the network itself. The sender timestamp component may also reside in user-mode space, but it would then provide less-accurate measurements of the network.

When the packets are received, the receiver timestamp component 82 records the local time and the packet identifier in the receiver timestamp buffer 1802. The packets are then passed up the stack through the other kernel-mode components 108 to the receiving application 135. As is the sender timestamp component 78, the receiver timestamp component is shown installed below the other receiver kernel-mode components to eliminate from the measurements any delays caused by those higher-level components.

Associating Sent Packet Records with Received Packet Records

To generate useful information from the timestamp data, an association is made between the time a packet is sent (data collected on the sender computer 62) and the time the same packet is received (data collected on the receiver computer 64). Making the association is not straightforward because the present invention does not alter the application packets to uniquely mark them. Instead, according to one aspect of the present invention, the packet timestamps are stored with a (mostly) unique packet identifier. This packet identifier can then be used to associate the sent and received times of the packets.

FIG. 19 is a data structure diagram showing one embodiment of the packet records that may be stored in the sender timestamp buffer 1801 and in the receiver timestamp buffer 1802. On a TCP/IP network, each packet flow may be uniquely identified by a quintuple of information: sender IP address 1901, sender port number 1902, receiver IP address 1903, receiver port number 1904, and network protocol 1905.

A packet may be identified by combining the packet flow identification quintuple with the IP Identification field (IP ID) 1906. The IP protocol specifies that this 16-bit field be part of the header of every IP packet. A computer increments the IP ID for each IP packet it sends, regardless of which packet flow carries the packet. Because 16 bits can code for only 64k different numbers, the IP ID is not completely unique and rolls over for every 64k packets transmitted by the sending computer. For non-IP networks, a different unique identifier can be identified to serve the purpose of the IP ID.

The jitter measurement tool 1800 matches a packet identifier sextuple (packet flow identifier quintuple plus IP ID) from the sender with an identical sextuple on the receiver. However, there are a few complications. Sent packets may have been lost on the network and thus may have no corresponding received packet record. Packets may not have been received in the same order in which they were sent. Finally, the IP ID is not unique because of its rollover after every 64k packets sent. To deal with these complications, one implementation of the method of the present invention imposes a sliding window on the 64k range of possible IP IDs and processes packets within that window.

This implementation is illustrated in FIGS. 20 and 21. FIG. 20A is a data structure diagram showing the packet records stored in the sender timestamp buffer 1801 following an illustrative jitter measurement test. The packet records have been simplified from their full form as shown in FIG. 19. Jitter measurement is performed within one packet flow so the packet flow identifier quintuple, items 1901 through 1905 in FIG. 19, has been omitted for clarity. In this jitter test, the sender computer 62 sent the packets as identified in the IP ID column 1906. The IP ID rolled over in the middle of the test. FIG. 20B is a data structure diagram that shows the packet records from this test as they are recorded in the receiver timestamp buffer 1802. The packets were not received in the order sent and some packets were lost.

Figure 21A:
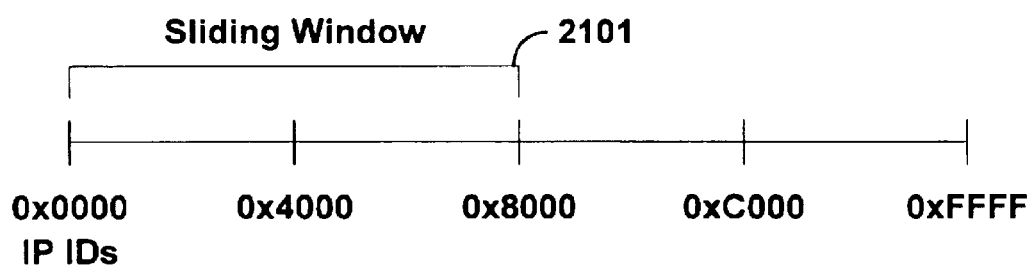
FIGS. 21A through 21D show the operation of a sliding window imposed onto the range of possible IP IDs and used to sort the received packet records.
Figure 21B:
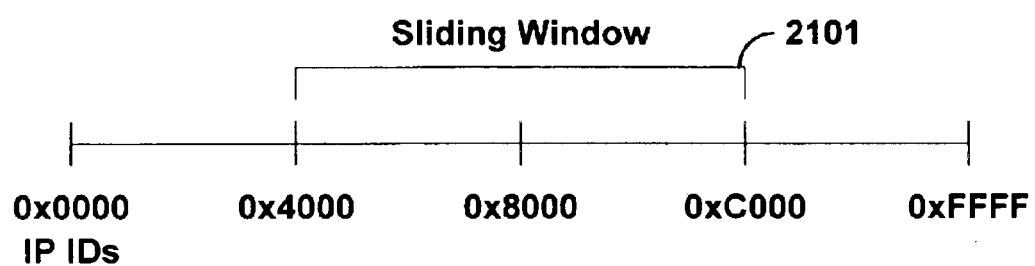
Figure 21C:
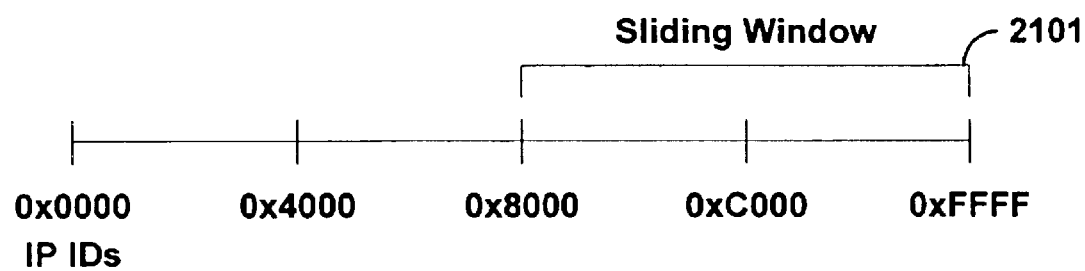

The association between the sent packet records in FIG. 20A and the received packet records in FIG. 20B may be formed through the following three-step procedure. First, the received packet records are sorted into the order in which the packets were sent. This example will show the received packet records being sorted within the receiver timestamp buffer 1802, but implementation considerations may call for the packet records to be moved elsewhere before processing, particularly if some of the packet records are to be processed while the test is still in progress. FIG. 21A shows the 64k range of possible IP IDs. The IP IDs are given in hexadecimal notation, running from 0 (0x0000) to 64k −1 (0xFFFF). A sliding window 2101 is imposed onto the range, the window starting with the IP ID of the first packet in the receiver timestamp buffer 1802. The sliding window should be significantly smaller than the range of possible IP IDs while being large enough to hold the IP IDs of several received packets. Here, the sliding window is chosen to cover half the range of possible IP IDs. It starts at 0x0000 and ranges to 0x8000. Packets with IP IDs within the range demarcated by the sliding window are sorted. Because the window in FIG. 21A does not span the IP ID rollover at 0xFFFF, sorting is done by simply putting lower-valued IP IDs before higher-valued ones. The result of this sort is the receiver timestamp buffer shown in FIG. 20C. Note that the last three IP IDs in the receiver timestamp buffer are outside the range of the sliding window in FIG. 21A and so are not sorted.

Once the IP IDs within the range of the sliding window 2101 are sorted, the window slides through half its range as shown in FIG. 21 B. The sorting is repeated, but in the present case, there are no IP IDs within the range of the sliding window so nothing changes. The window sliding and sorting continues with no result until the window reaches the position shown in FIG. 21C. Here, the window ranges from 0x8000 to 0xFFFF, which range includes the final three entries in the receiver timestamp buffer 1802. Those entries are sorted resulting in the receiver timestamp buffer shown in FIG. 20D.

Figure 21D:
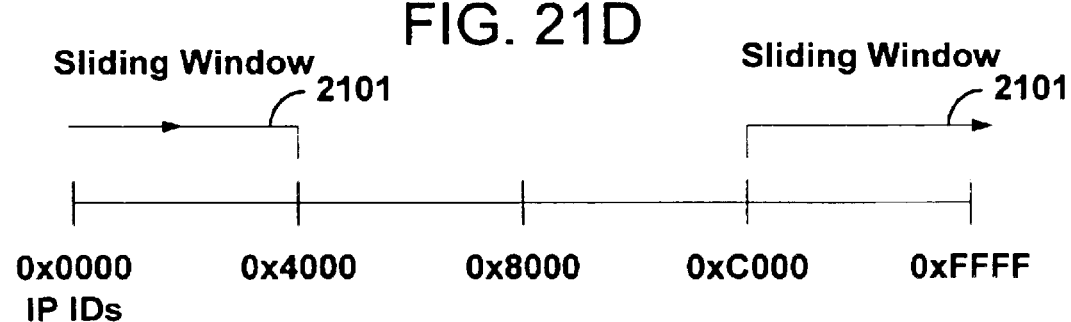

The window 2101 slides once more and, as shown in FIG. 21D, ranges from 0xC000 to 0x4000, wrapping around the rollover point at 0xFFFF. Sorting in this window is slightly different from the previous cases because all IP IDs in the 0x0000–0x4000 range are sorted to come after all IP IDs in the 0xC000–0xFFFF range. This sorting accounts for the rollover in IP IDs and results in the receiver timestamp buffer 1802 shown in FIG. 20E. With the next window slide, the window returns to its original position and the sliding and sorting step is complete. A comparison of FIGS. 20A and 20E shows that this step has correctly sorted the received packet records into the order in which the packets were sent.

The second step of associating sent with received packet records logically begins by bringing together the packet records in the two timestamp buffers 1801 and 1802. This may be done physically by transmitting the records in one buffer to the other computer or by transmitting the records in both buffers to a third computer. It may also be done virtually by letting the jitter measurement tool access the packet records wherever they are located. The records in the two timestamp buffers may be brought together after the jitter test has run its course or during the test to provide ongoing results.

The receiver timestamp buffer 1802 is searched for a packet record matching the first packet record in the sender timestamp buffer 1801. A match is found if the packet identifier sextuple (packet flow identifier quintuple plus IP ID) is the same in both packet records. If no match is found for the first sent packet record, then that packet was probably lost in transmission. In that case, the search resumes with the second sent packet record and proceeds until a match is found. The processing burden of the search is lessened by the fact that the received packet records have already been sorted into the order in which the packets were sent, that is, the order of monotonically increasing IP IDs (modulo the 64k rollover). If a match is not found within the window in the receiver timestamp buffer that contains the sent packet record, then the sent packet is assumed to have been lost in transmission.

The final step of association begins once a match has been found for a sent packet record. The receiver timestamp buffer 1802 is searched for a match for each sent packet record that follows the first matched packet record. In this manner, each sent packet record is either matched to a received packet record or marked as lost in transmission. When the association is complete, the results are as shown in FIG. 22. Packet send times are associated with their receive times and lost packets are noted.

The three steps just described are illustrative only and are not intended to limit the scope of the present invention. The steps may be reordered, combined, eliminated, or replaced by other processing means. The final result of the processing, however accomplished, is the association between sent and received times for the packets.

Sending the Processed Timestamp Data to the Previously Described Jitter Analysis Tool The result of the above processing is a data file, illustrated in FIG. 22, similar in content to the packet log 112 of FIG. 5. That data file can then be further processed using the same techniques described in the above sections in relation to analyzing jitter using packets generated by the jitter measurement tool itself. Specifically, the processing may proceed through the steps portrayed as items 114 through 126 of FIG. 5 and detailed in the flow diagram of FIGS. 15 through 17. Just as above, clock skew and timer jumps can be corrected. Jitter and packet loss ratios are calculated and presented to the user.

In view of the many possible embodiments to which the principles of this invention may be applied, it should be recognized that the embodiments described herein with respect to the drawing figures are meant to be illustrative only and should not be taken as limiting the scope of invention. The invention may also be practiced on non-"WINDOWS" machines and on any kind of network, including wireless networks. Therefore, the invention as described herein contemplates all such embodiments as may come within the scope of the following claims and equivalents thereof.

We claim:

1. A method for calculating the jitter of a packet flow sent by a program on a sending computer over a network to a receiving computer, comprising:
   accessing data collected on the sending computer, said data comprising identifiers of a plurality of packets sent by the program along with timestamps representing the times of transmission of the sent packets;
   accessing data collected on the receiving computer, said data comprising identifiers of a plurality of packets received from the network along with timestamps representing the times of reception of the received packets;
   associating, through the use of the sent and received packet identifiers, at least some of the sent packets with received packets by comparing a field uniquely identifying the packet flow in the sent and received packet identifiers and comparing an IP ID assigned to the packet in the sent and received packet identifiers; and
   calculating jitter as the variation in the differences between the reception and transmission timestamps of associated packets,
   wherein associating at least some of the sent packets with received packets comprises using the received packet identifiers to reorder the data collected on the receiving computer into the order in which the received packets were sent,
   wherein reordering comprises comparing a rollover component of the received packet identifiers, and
   wherein reordering further comprises imposing a window on the range of possible values of the rollover component that is smaller than the range of possible values of the rollover component of the received packet identifiers and reordering only the data the values of whose rollover component are within the window.

2. The method of claim 1 wherein reordering further comprises moving the window throughout the range until all the data are reordered.

3. A method for calculating the jitter of a packet flow sent by a program on a sending computer over a network to a receiving computer, comprising:
   accessing data collected on the sending computer, said data comprising identifiers of a plurality of packets sent by the program along with timestamps representing the times of transmission of the sent packets;
   accessing data collected on the receiving computer, said data comprising identifiers of a plurality of packets received from the network along with timestamps representing the times of reception of the received packets;
   associating, through the use of the sent and received packet identifiers, at least some of the sent packets with received packets by comparing a field uniquely identifying the packet flow in the sent and received packet identifiers and comparing an IP ID assigned to the packet in the sent and received packet identifiers; and calculating jitter as the variation in the differences between the reception and transmission timestamps of associated packets, wherein associating at least some of the sent packets with received packets comprises using the received packet identifiers to reorder the data collected on the receiving computer into the order in which the received packets were sent, wherein reordering comprises comparing a rollover component of the received packet identifiers, wherein associating comprises imposing a window on the range of possible values of the rollover component that is smaller than the range of possible values of the rollover component of the received packet identifiers and searching for a received packet identifier to match a sent packet identifier only among those data the values of whose rollover component are within the window.

4. The method of claim 3 wherein associating further comprises moving the window throughout the range until all sent packets are either associated with received packets or are noted as lost in transmission.

* * * * *